United States Patent

[11] 3,622,974

[72] Inventors: Frederick A. Best, Milwaukee; Arden G. Gillund, Oak Creek; Trevor O. Jones, Milwaukee, all of Wis.
[21] Appl. No.: 35,980
[22] Filed: May 11, 1970
[45] Patented: Nov. 23, 1971
[73] Assignee: General Motors Corporation, Detroit, Mich.

[54] AIR CUSHION ACTUATION AND FAILURE WARNING CIRCUIT
2 Claims, 4 Drawing Figs.

[52] U.S. Cl. .................................................. 340/53, 340/52 H, 280/150, 180/103
[51] Int. Cl. ........................................................ B60r 21/00
[50] Field of Search ............................................. 340/52 H, 53; 280/150; 200/61.45; 180/103, 104

[56] References Cited
UNITED STATES PATENTS
| | | | |
|---|---|---|---|
| 3,485,973 | 12/1969 | Kaiser | 200/61.45 |
| 3,495,675 | 2/1970 | Hass et al. | 200/61.45 X |
| 3,556,556 | 1/1971 | Goetz | 200/61.45 X |

Primary Examiner—Alvin H. Waring
Attorneys—Eugene W. Christen, Creighton R. Meland and Albert F. Duke ABSTRACT: A control circuit for actuating an inflatable air cushion in a motor vehicle including an electrically fired actuator connected between a pair of SCR's which are triggered from respective vehicle deceleration sensors. A storage capacitor is discharged through the SCR's and actuator upon a deceleration of predetermined magnitude and duration. Failure warning circuitry is provided for simulated operation of the sensors and for detecting the voltage at a junction in the control circuit to determine whether various components of the control circuit are functioning properly, and if not, to provide an indication to the operator of the vehicle.

INVENTORS
Frederick A. Best,
Arden G. Gillund &
Trevor O. Jones

BY Albert F. Duke
ATTORNEY

AIR CUSHION ACTUATION AND FAILURE WARNING CIRCUIT

This invention relates to a control circuit for actuating air cushions positioned within a motor vehicle, and more particularly to such a control circuit including failure warning means for detecting and indicating a malfunction in the control circuit prior to operation of the vehicle.

It is an object of the present invention to diagnose malfunctions in such an air cushion actuation control circuit each time the vehicle is started and to inform the vehicle operator of any such malfunction prior to operation of the vehicle.

In accordance with the present invention the control circuit for actuating an air cushion includes a storage capacitor which is connected across a series network including one or more air cushion actuators connected between a pair of silicon control rectifiers. The silicon control rectifiers are controlled from respective input sensors adapted to trigger the rectifiers into conduction to discharge the capacitor through the actuators in response to deceleration of the vehicle of a predetermined magnitude and duration. Prior to charging of the capacitor a simulated closure of the sensors is accomplished and the voltage at a junction in the control circuit is sensed to determine if various possible malfunctions in the circuit exist. If a malfunction exist, an indicator lamp is energized to indicate the malfunction.

A more complete understanding of the present invention may be had from the following detailed description which should be read in conjunction with the drawings in which.

Figure 1:
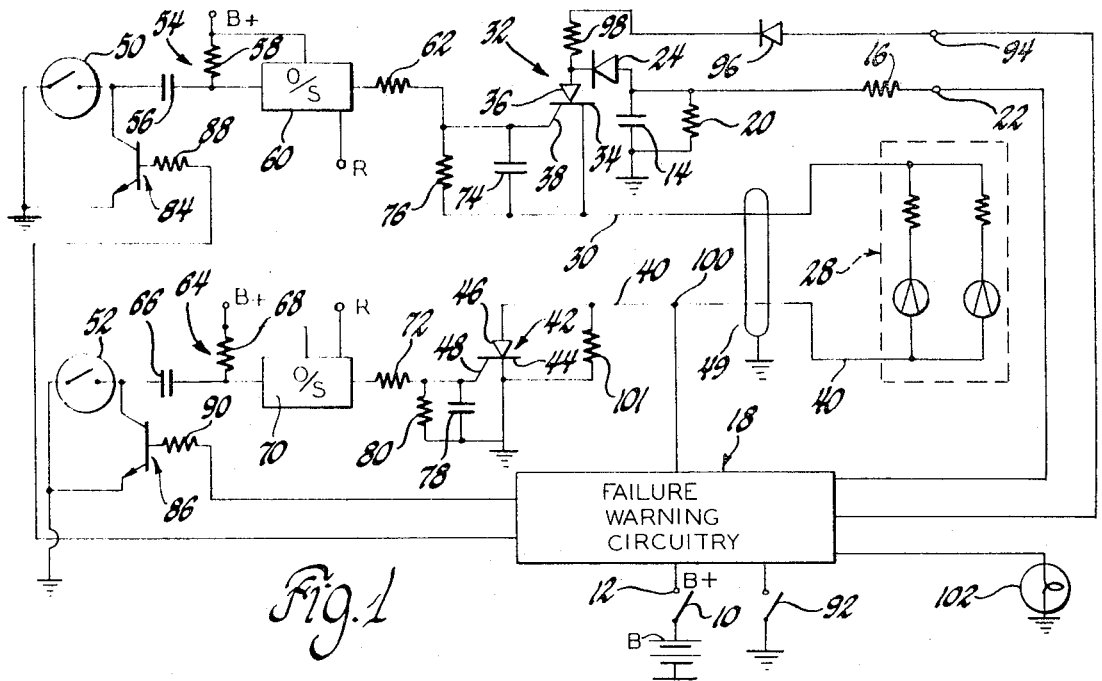
FIG. 1 is a part schematic, part block diagram of the control circuit of the present invention.

Referring now to the drawings and initially to FIG. 1, a source of voltage such as the vehicle battery B is shown to have a positive terminal connected with a manually operable on-off switch such as the vehicle ignition switch 10 and a negative terminal connected to a reference potential shown as ground. The ignition switch 10 is operable to connect the positive terminal of the battery B to a terminal 12 which is hereinafter referred to in the specification and shown in the drawings as B+. A storage capacitor 14 is connected to B+ through a from resistor 16, and failure warning circuitry generally designated 36,080, which will be described in detail hereinafter. A resistor 20 is connected in parallel with the capacitor 14 and provides a discharge path for capacitor 14 upon removal of B+ from the junction 22. The capacitor 14 stores a charge which is utilized to operate one or more parallel-connected actuators or squibs generally designated 28 for the purpose of actuating a safety device such as an air cushion. As is well known in the art, the squibs 28 may be fired electrically to rupture the diaphragm of a sealed-pressure vessel thereby inflating an associated air cushion. Further details regarding the apparatus for inflating the air cushion in response to firing the squibs 28 may be found in copending patent application Ser. No. 36,080, filed May 11, 1970, and assigned to the assignee of the present invention. The squibs 28 are connected to the capacitor 14 through a conductor 30, a semiconductor switch 32, and a diode 24. The switch 32 is preferably a silicon controlled rectifier (SCR) having a cathode 34, an anode 36, and a control electrode or gate 38. The squibs 28 are also connected to ground through a conductor 40 and a silicon control rectifier 42 which has a cathode 44, an anode 46, and a gate 48. Since the SCR's 32 and 42 are connected to opposite sides of the squibs 28 both SCR's 32 and 42 must be rendered conductive before the squibs 28 can be fired. The conductors 30 and 40 are shielded as shown at 49.

Discharge of the capacitor 14 through the squibs 28 is under the control of a pair of sensors 50 and 52 which are illustrated as normally open switches adapted to close in response to a predetermined deceleration of the vehicle. A suitable sensor is described in copending application Ser. No. 35,674, filed May 8, 1970, entitled SENSOR by Arden G. Gillund and assigned to the assignee of the present invention. The sensor 50 is connected to B+ through an integrator generally designated 54 which includes a capacitor 56 and a resistor 58. The integrator 54 provides a short time delay between closure of the sensor 50 and actuation of a one-shot multivibrator generally designated 60. The multivibrator 60 when actuated provides an output pulse for a fixed interval of time and thereafter automatically resets to its stable state. The output of multivibrator 60 is applied through a current-limiting resistor 62 to the gate electrode 38 of the SCR 32. The trigger circuit for SCR 44 comprises an electrical integrator 64 including a capacitor 66 and a resistor 68 which is employed to actuate a one-shot multivibrator 70 which supplies a pulse to the gate 48 of SCR 44 through a current-limiting resistor 72. The multivibrators 60 and 70 may also be reset to their stable state by the application of a pulse to the reset terminal R. In order to prevent invertent firing of the SCR from transients in the circuit a filter capacitor 74 and a bleed resistor 76 are connected between the gate 38 and cathode 34 of the SCR 32. Likewise, a filter capacitor 78 and resistor 80 are connected between the gate 48 and the cathode 44 of SCR 42.

As will be explained more fully hereinafter, the failure warning circuitry 18 is provided for diagnosing malfunctions in the circuits. Each time the engine of the vehicle is started and prior to application of B+ to the terminal 22, the existence of a malfunction is detected by simulating closure of the sensors 50 and 52. This simulated closures is accomplished by a transistor 84 which has its emitter and collector electrodes connected in parallel with the sensors 50 and by a transistor 86 which has its emitter and collector electrodes connected in parallel with the sensor 52. The base electrodes of transistors 84 and 86 are connected to the circuitry 18 through resistors 88 and 90 respectively. The circuitry 18 also receives an input from a switch 92 which is closed whenever the vehicle engine is running. The switch 92 may, for example, be the manifold vacuum switch presently on the vehicle. The circuitry 18 also establishes B+ at a junction 94 for a fixed interval of time, subsequent to closure of switches 10 and 92, during which time the diagnosis of circuit malfunction is performed. The junction 94 is connected to the SCR 32 through a diode 96 and a current-limiting resistor 98 which limits the current to a value below that required to fire the squibs 28. The circuitry 18 senses the voltage at a junction 100 located between the squibs 28 and the SCR 42. The junction 100 is grounded through a current-limiting resistor 101. Based on the magnitude of the voltage at the junction 100 the existence of a failure in the circuit is determined. Any malfunction is indicated by energization of the indicator lamp 102.

Figure 2:
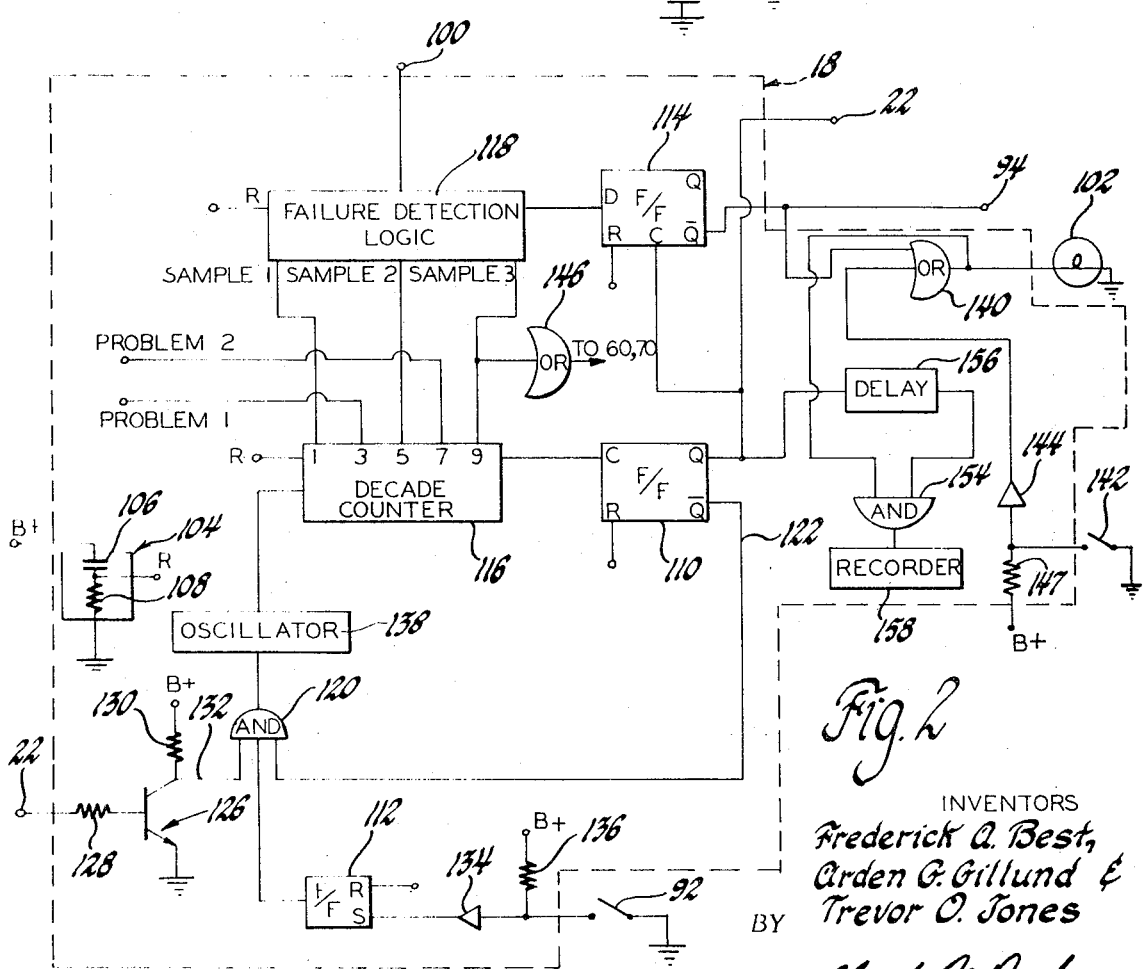
FIG. 2 is a block diagram of the failure warning portion of the circuitry.

Referring now to FIG. 2, the failure warning circuitry 18 is shown in more detail and includes a reset generator 104, formed of a capacitor 106 and a resistor 108, which provides a reset pulse at terminal R. Terminal R is connected to the junction between the capacitor 106 and resistor 108. The reset pulse appearing at the terminal R which occurs upon closure of the ignition switch 10 is applied to the indicated R terminals on set-reset flip-flops 110 and 112, data flip-flop 114, decade counter 116, and failure detection logic 118 to reset these components to an initial condition. Thus, flip-flop 110 is reset to establish a "one" output at its $\bar{Q}$ terminal which is applied to AND-gate 120 through conductor 122. Concurrently, a "zero" output is established at the Q terminal of flip-flop 110 which is connected to the previously mentioned junction 22. Flip-flop 112 is reset to establish a "zero" output which is applied to AND-gate 120. A transistor 126 has its emitter grounded, its base connected to the junction 22 through a resistor 128, and its collector connected through a resistor 130 to B+ When the transistor 126 is nonconductive a "one" input is applied to AND-gate 120 through the conductive 132. The transistor 126 is rendered conductive whenever the capacitor 14 is charged so as to apply a "zero" input to and AND-gate 120. Thus, AND-gate 120 can be activated only when the capacitor 14 is discharged. This prevents inadvertent firing of the squibs 28 upon simulated closure of the sensors 50 and 52. The vacuum switch 92 is connected to the set terminal of the flip-flop 112 through a logic inverter 134 and to B+ through a bias resistor 136. Upon closure of the vacuum switch 92 a "-Zero" input is applied to the inverter 134 which produces a "one" output to set the flip-flop 112 and provide a "one" input to the AND gate 120. The data flip-flop 114 is reset to establish a "one" output at its $\bar{Q}$ terminal which is connected to the aforementioned junction 94. The output of AND-gate 120 is connected to an oscillator 138 which provides a series of pulses to the decade counter 116.

The decade counter 116 is provided with output terminals 1, 3, 5, 7 and 9. Terminals 3 and 7 are connected respectively to the bases of transistors 84 and 86 while terminals 1, 5, and 9 are connected to failure detection logic circuitry 118. Output terminal 9 of counter 116 is also connected to an OR-gate 146 the output of which is connected to the R terminal of multivibrators 60 and 70. The data flip-flop 114 has its D terminal connected to the logic circuitry 118 and has its $\bar{Q}$ connected to an Or gate 140. The OR gate 140 receives a second input from a pressure switch 142 which senses the pressure in the aforementioned pressure vessel employed to inflate the air cushion. The switch 142 is connected to the OR gate 140 through a logic inverter 144 and to B+ through a bias resistor 146. The output of the OR gate 140 is connected to the indicator lamp 102. The output of OR-gate 140 is also connected to an AND-gate 154 which receives a second input from the Q terminal of flip-flop 110 through a delay circuit 156. The Q terminal of flip-flop 110 is also connected to the clock input C of data flip-flop 114. The clock terminal C of flip-flop 110 is connected to the counter 116 to switch the Q terminal output of flip-flop 110 from a "zero" to a "one" upon receipt of the carry pulse from counter 116 which represents the conclusion of the diagnosis of circuit malfunctions. The output of the AND-gate 154 is connected to a recorder 158 to provide a permanent record of any malfunction in the circuit.

Figure 3:
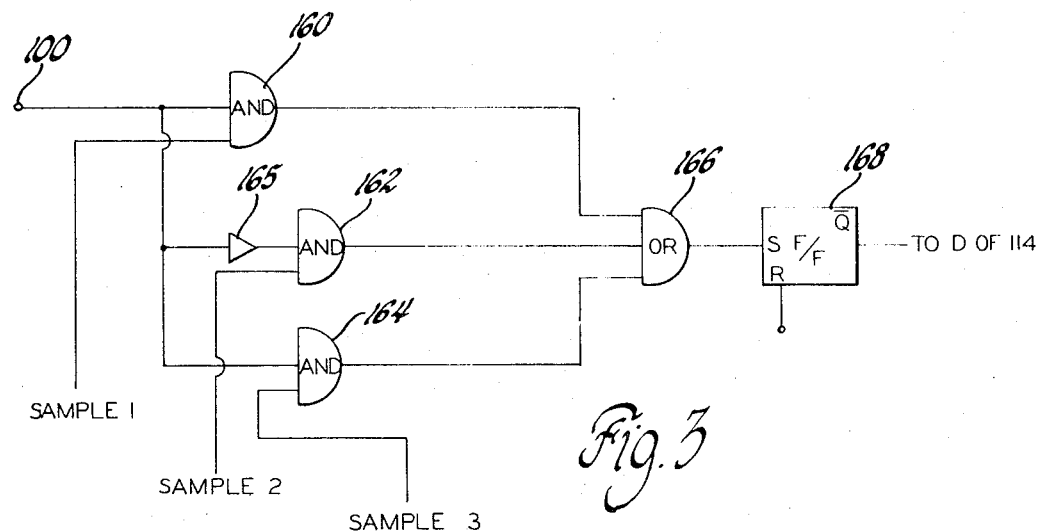
FIG. 3 is a logic diagram of the failure detection logic employed in the failure warning portion of the circuit.

Referring now to FIG. 3, the failure detection logic is shown to include AND-gates 160, 162, and 164. The voltage at terminal 100 is applied directly to AND-gates 160 and 164 and through a logic inverter 165 to the AND-gate 162. AND-gates 160, 162, and 164 also receive inputs from terminals 1, 5, and 9 of the counter 116. The output of the AND-gates 160, 162, and 164 provide inputs to an OR-gate 166, the output of which is connected to the set terminal on a set-reset flip-flop 168. The flip-flop 168 is initially reset to provide a logic "one" output at the $\bar{Q}$ terminal. The $\bar{Q}$ terminal is connected to the D terminal on data flip-flop 114.

Figure 4:
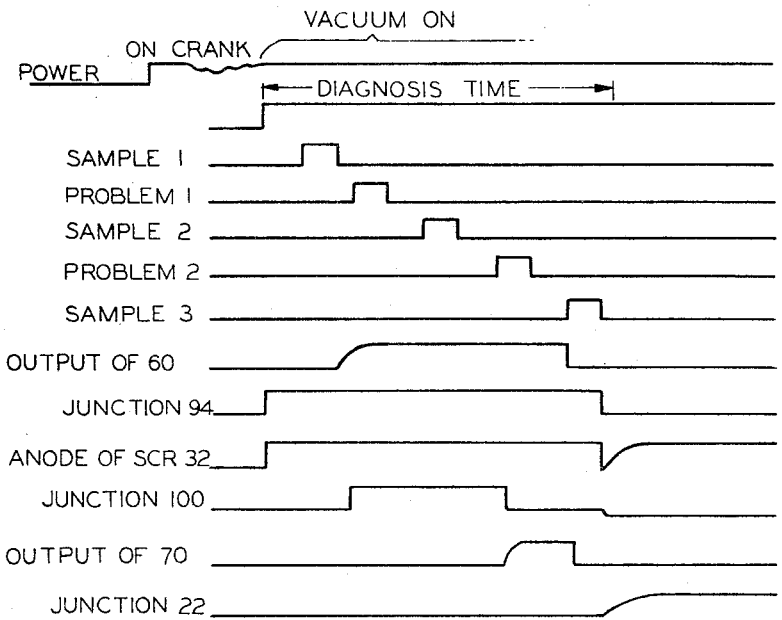
FIG. 4 shows various waveforms existing in the circuit.

The operation of the circuit will not be described with reference to the aforementioned drawings as well as to FIG. 4 which shows on a voltage vs. time scale the waveforms at various junctions in the circuit. When the ignition switch 10 is closed the reset generator 104 provides a pulse which resets the various components in the circuit. This produces a "one" output on the $\bar{Q}$ terminal of flip-flop 114 to energize the indicator lamp 102. If the capacitor 14 is in a discharge condition a "one" input is applied to AND-gate 120 through conductor 132. A "one" input is also applied to AND-gate 120 from the $\bar{Q}$ output of flip-flop 110 through conductor 122. Thus when the vacuum switch 92 closes the flip-flop 112 is set to provide a "one" input to AND-gate 120 activating the oscillator 128. Simultaneously a voltage is established at the junction 94. The voltage at the junction 100 during the time of sample pulse 1 should be low or logic "zero." If, however, the sensor 50 or the SCR 32 is shorted current will flow through the conductors 30 and 40 and the resistor 101 establishing a high or logic "one" at the junction 100. In that event the flip-flop 168 would be set to provide a "zero" at the $\bar{Q}$ terminal.

When a pulse appears at the terminal 3 of the decade counter 116, the transistor 84 is rendered conductive providing a charging path for capacitor 56 which triggers the one-shot multivibrator 60 and renders the SCR 32 conductive. Current now flows through the conductors 30 and 40 and the resistor 101 raising the voltage at junction 100 to a logical "one." The "one" input to inverter 165 is converted to a "-zero" input to AND-gate 162. If, on the other hand, the sensor 52 or the SCR 42 is shorted or if there is a malfunction in the electronics between the sensor 50 and SCR 32 the voltage at the junction 100 will drop to a logical "zero" input to AND-gate 162. Consequently during the time of sample pulse 2 the "one" output of AND-gate 162 would be passed through the OR-gate 166 to set the flip-flop 168.

When an output pulse appears on terminal 7 of decade counter 116 the transistor 86 is rendered conductive to provide a charging path for capacitor 66 which activates one-shot multivibrator 70 to render the SCR 42 conductive. With the SCR 42 conducting, the voltage at junction 100 should be low. If, however, there is a malfunction in the electronics between the sensors 52 and the SCR 42 such that the SCR 42 is not rendered conductive, then the junction 100 would be high and during the interval of time of sample pulse 3 the AND-gate 164 would set the flip-flop 168. Also during the time of sample pulse 3 the multivibrator 60 and 70 are reset through the OR-gate 146. At the conclusion of the tenth pulse to the decade counter 116 the flip-flop 110 is clocked to place a "zero" on the $\bar{Q}$ terminal deenergizing the oscillator 138 through the AND-gate 120. Concurrently, a "one" output is obtained on the Q terminal of flip-flop 110 which is connected to the junction 18 which permits the capacitor 14 to be charged. At the same time the data flip-flop 114 is clocked to pass the data appearing on the D input of flip-flop 114 to the Q terminal. If no malfunction has been detected the flip-flop 168 retains a "one" output on the $\bar{Q}$ terminal and upon clocking of the flip-flop 114, the $\bar{Q}$ terminal of flip-flop 114 changes from a "one" to a "zero" deenergizing the lamp 102. If on the other hand a malfunction is detected, the flip-flop 168 is set producing a "-zero" output on the $\bar{Q}$ terminal or flip-flop 168 and upon clocking of the flip-flop 114 the $\bar{Q}$ terminal of flip-flop 114 retains its logic "one" maintaining the lamp 102 in an energized condition. The resulting "one" output on OR gate 140 is fed into AND-gate 154 and after a predetermined delay to insure that the electronics has reached a quiescent state, the "one" input from the Q terminal of flip-flop 110 is applied to the AND-gate 154 to operate the recorder 158.

With the capacitor 14 in a charged condition any deceleration of the vehicle which causes closure of the sensors 50 and 52 for an interval of time sufficient to charge the capacitors 56 and 66 to a level sufficient to activate the one-shot multivibrator 60 and 70 will trigger the SCR 32 and 42 thus discharge the capacitor 14 through the squibs 28 and thereby inflate the air cushion.

Having thus described our invention what we claim is:

1. In a passenger conveyance provided with a safety device adapted to be actuated by electrically operated actuator means, a control circuit for operating said actuator means comprising, a storage capacitor, means for charging said capacitor, first and second normally open switch means, means including said first switch means connecting one side of said actuator to said capacitor, means including said second switch means connecting the other side of said actuator means and to a reference potential, means including first and second normally open sensor switch means responsive to acceleration of said conveyance of a predetermined magnitude for actuating said first and second normally open switch means, to thereby discharge said capacitor and operate said actuator means, failure warning circuit means for diagnosing a malfunction in said control circuit prior to charging of said capacitor and comprising indicator means, means for applying a test current to the series network of said actuator means and said normally open switch means, said test current being of a magnitude less than that required to operate said actuator means, means for simulating closure of said first and second sensor means in sequence, means for sampling the voltage at a junction in said circuit after closure of each of said sensor means and providing a logic output indicative of a malfunction in the control circuit, and means responsive to said logic output for controlling the energization of said indicator means.

2. In a motor vehicle provided with an inflatable safety device adapted to be inflated by electrically operated actuator means, a source of voltage, and an ignition switch connected thereto; a control circuit for operating said actuator means comprising:

first and second normally nonconductive semiconductor switch means each having a control electrode and adapted to be rendered conductive by a pulse applied to said control electrode, said first and second semiconductor switch means being connected to opposite sides of said actuator means to form a series network connected at one end thereof to a reference potential, a storage capacitor connected in parallel with said series network, first and second monostable switch means actuable to apply said pulse to the control electrode of said first and second semiconductor switch means respectively, first and second normally open sensor switch means responsive to deceleration of said vehicle, first and second integrator means connected respectively with said first and second normally open switch means for respectively actuating said first and second monostable switch means, failure warning circuit means energizable through said ignition switch and comprising means for supplying a test current to said series network for a predetermined interval of time, said test current being of a magnitude less than that required to operate said actuator means, means for simulating closure of said first and second sensor means including a pair of transistors connected across respective ones of said sensor switch means, timing means for generating a plurality of individual output pulses in sequence, means connecting said transistors to said timing means to render said transistors conductive in response to generation of respective ones of said output pulses, failure detection logic means connected to said timing means for sampling the voltage at a junction between said detector means and said second semiconductor switch means prior to simulated closure of said first sensor switch means and subsequent to simulated closure of each of said sensors switch means and for providing a logic output indicative of a malfunction in the control circuit, indicator means, means responsive to said logic output for controlling the energization of said indicator means, means responsive to the expiration of said predetermined time interval for connecting said capacitor to said ignition switch, means responsive to an engine running condition, means responsive to a charge condition of said capacitor, means for inhibiting operation of said timing generator when either said capacitor is charged or said engine is not running.

* * * * *

PO-1050
(5/69)

UNITED STATES PATENT OFFICE
CERTIFICATE OF CORRECTION

Patent No. __3,622,974__   Dated __November 23, 1971__

Inventor(s) __Frederick A. Best, Arden G. Gillund, Trevor O. Jones__

It is certified that error appears in the above-identified patent and that said Letters Patent are hereby corrected as shown below:

In the Specification, Column 1, line 46, after "through a" insert -- current limiting -- and delete "from", line 47, delete "36,080" and insert -- 18 --. Column 4, line 5, after "a logical "zero" ", insert -- which is inverted by the inverter 166 to provide a "one" --.

Signed and sealed this 13th day of June 1972.

(SEAL)
Attest:

EDWARD M. FLETCHER, JR.
Attesting Officer

ROBERT GOTTSCHALK
Commissioner of Patents